US010995530B2

(12) United States Patent
Dyer

(10) Patent No.: US 10,995,530 B2
(45) Date of Patent: May 4, 2021

(54) HOLD OPEN ROD HAVING AN INTERNAL LOCK

(71) Applicant: MarathonNorco Aerospace, Inc., Waco, TX (US)

(72) Inventor: Benjamin Dyer, Waco, TX (US)

(73) Assignee: MarathonNorco Aerospace, Inc., Waco, TX (US)

(*) Notice: Subject to any disclaimer, the term of this patent is extended or adjusted under 35 U.S.C. 154(b) by 166 days.

(21) Appl. No.: 16/101,697

(22) Filed: Aug. 13, 2018

(65) Prior Publication Data

US 2019/0048629 A1 Feb. 14, 2019

Related U.S. Application Data

(60) Provisional application No. 62/544,326, filed on Aug. 11, 2017.

(51) Int. Cl.
| | |
|---|---|
| *E05C 17/30* | (2006.01) |
| *E05C 17/16* | (2006.01) |
| *E05B 55/00* | (2006.01) |
| *B64C 1/14* | (2006.01) |
| *E05B 9/08* | (2006.01) |

(52) U.S. Cl.
CPC ............ *E05C 17/30* (2013.01); *B64C 1/1461* (2013.01); *E05B 55/005* (2013.01); *E05C 17/166* (2013.01); *E05B 9/084* (2013.01)

(58) Field of Classification Search
CPC ........ E05B 55/005; E05B 9/084; E05C 17/30; E05C 17/166; F16B 45/04; B64D 29/06; B64C 1/1461

USPC ......... 70/224, 208, 94; 292/259 R, 361, 288, 292/289
See application file for complete search history.

(56) References Cited

U.S. PATENT DOCUMENTS

| | | | | |
|---|---|---|---|---|
| 4,295,413 A | * | 10/1981 | Kamimura | ............ F15B 15/261 92/24 |
| 5,535,861 A | * | 7/1996 | Young | ........................ F16F 7/09 188/129 |
| 7,654,371 B1 | * | 2/2010 | Metz | ......................... F16F 9/56 188/300 |
| 9,067,669 B2 | * | 6/2015 | Wheeler | .................... B64C 1/06 |
| 10,670,063 B2 | * | 6/2020 | Artin | ........................ E05C 17/30 |

(Continued)

FOREIGN PATENT DOCUMENTS

WO WO-2014071270 A1 * 5/2014 ............ F16F 9/0254

*Primary Examiner* — Suzanne L Barrett
(74) *Attorney, Agent, or Firm* — BakerHostetler

(57) ABSTRACT

A hold open rod includes an inner member, an outer member configured to have the inner member slide in and out of the outer member, and a locking mechanism configured to selectively lock the inner member and the outer member with respect to each other. The locking mechanism includes a locking plug configured to move axially along an axis of the inner member and the outer member to a locking position and an unlocking position, a locking dog configured to move radially between a locking position and an unlocking position as a result of a camming action with the locking plug as the locking plug moves axially, and a lock transfer bar operatively connected to the locking plug and configured to move the locking plug to the locking position and the unlocking position when the lock transfer bar is moved.

20 Claims, 11 Drawing Sheets

(56) References Cited

U.S. PATENT DOCUMENTS

| | | | |
|---|---|---|---|
| 2009/0324327 A1* | 12/2009 | McAndrews | B62J 1/08 403/409.1 |
| 2010/0024161 A1* | 2/2010 | Wood | E05C 17/30 16/82 |
| 2013/0206955 A1* | 8/2013 | Palma | E05C 17/30 248/602 |
| 2015/0267724 A1* | 9/2015 | Dyer | F15B 15/261 92/15 |
| 2016/0069118 A1* | 3/2016 | Artin | F16B 7/105 16/85 |
| 2018/0223572 A1* | 8/2018 | Artin | B64D 29/08 |
| 2019/0032377 A1* | 1/2019 | Dyer | E05C 17/30 |
| 2019/0063134 A1* | 2/2019 | Anderson | E05C 17/30 |
| 2020/0018096 A1* | 1/2020 | Dyer | E05C 17/30 |
| 2020/0063481 A1* | 2/2020 | Bouman | F15B 15/148 |
| 2020/0087001 A1* | 3/2020 | Dyer | E05B 47/0002 |

\* cited by examiner

HOLD OPEN ROD HAVING AN INTERNAL LOCK

CROSS-REFERENCE TO RELATED APPLICATIONS

This application claims the benefit of U.S. Provisional Application No. 62/544,326 filed on Aug. 11, 2017, which is hereby incorporated by reference in its entirety for all purposes as if fully set forth herein.

FIELD OF THE DISCLOSURE

The disclosure relates generally to a hold open rod. More particularly, the disclosure relates to an apparatus and method for locking and releasing a lock mechanism of a hold open rod.

BACKGROUND OF THE DISCLOSURE

Hold open rods are well known in the automotive industry, the aviation industry, and other industries. Hold open rods hold open a door, a hatch, and like structure after being opened manually or automatically. Hold open rods support a considerable amount of weight, particularly in the aviation industry. It is desirable that the hold open rod functions correctly and does not malfunction in supporting this weight.

Generally, the hold open rod includes two cylindrical telescoping tubes, a first tube disposed inside a second tube, an inner and outer tube, respectively. In a fully retracted position, the inner tube is generally located almost entirely within the outer tube. The inner tube can be extended to a designated position to hold open the door, the hatch, or the like. At this extended position, the tubes are locked in place, holding open the door for a period of time. Such locking prevents the inner tube from retracting into the outer tube and also allows the tubes to withstand the weight of the door or hatch. The locking mechanism can typically only be released by an operator.

The hold open rod is typically configured to be fully extended or fully retracted. There is no ability to have a robust intermediate lock position. Moreover, previous lock mechanisms have had poor performance due to stepped diameter constructions of the inner tube. These stepped portions were required and increased manufacturing cost and operational failures. Additionally, these stepped portions resulted in an undesirable sloppy fit.

Accordingly, it is desirable to provide an improved locking mechanism that provides robust intermediate locking functionality, holds large loads, and the like.

SUMMARY OF THE DISCLOSURE

The foregoing needs are met, to a great extent, by the disclosure, wherein in one aspect a technique and apparatus are provided for a hold open rod having an internal lock structure.

In accordance with one aspect a hold open rod includes an inner member; an outer member configured to have the inner member slide in and out of the outer member; and a locking mechanism configured to selectively lock the inner member and the outer member with respect to each other, the locking mechanism including: a locking plug configured to move axially along an axis of the inner member and the outer member to a locking position and an unlocking position; a locking dog configured to move radially between a locking position and an unlocking position as a result of a camming action with the locking plug as the locking plug moves axially; and a lock transfer bar operatively connected to the locking plug and configured to move the locking plug to the locking position and the unlocking position when the lock transfer bar is moved, wherein the locking mechanism is configured to lock the inner member and the outer member with respect to each other along a number of intermediate positions between a maximum length and a minimum length.

In accordance with one aspect a hold open rod includes an inner member; an outer member configured to have the inner member slide in and out of the outer member; and a locking mechanism configured to selectively lock the inner member and the outer member with respect to each other, the locking mechanism including: a locking plug configured to move axially along an axis of the inner member and the outer member to a locking position and an unlocking position; a locking dog configured to move radially between a locking position and an unlocking position as a result of a camming action with the locking plug as the locking plug moves axially; and a lock transfer bar operatively connected to the locking plug and configured to move the locking plug to the locking position and the unlocking position when the lock transfer bar is moved.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
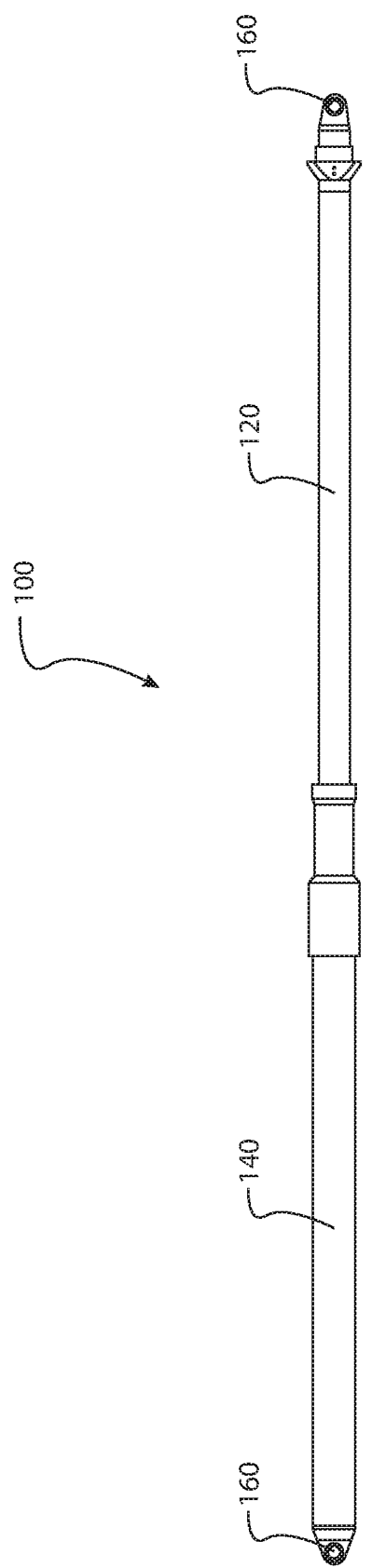
FIG. 1 illustrates a hold open rod according to one aspect of the disclosure.

The disclosure will now be described with reference to the drawing figures, in which like reference numerals refer to like parts throughout. An aspect in accordance with the disclosure provides a hold open rod with a locking mechanism configured to have intermediate locking configurations and a release system for unlocking the hold open rod.

FIG. 1 illustrates a hold open rod according to one aspect of the disclosure. In particular, FIG. 1 illustrates a hold open rod 100 that may include an inner tube 120 and an outer tube 140. The outer tube 140 surrounds the inner tube 120. Both ends of the hold open rod 100 may include a fastener portion 160, such as a bearing, bushing, or the like for coupling the hold open rod 100 to a particular application, for example, an aircraft door, a door frame, nacelle, or the like (not shown). In one aspect, the fastener portion 160 may be a spherical bearing. The outer tube 140 is shown in cross-section in the Figures. In one aspect, the outer tube 140 may have a generally cylindrical construction. Likewise, inner tube 120 is shown in cross-section in the Figures. In one aspect, the inner tube 120 may have a generally cylindrical construction. In other aspects, both the outer tube 140 and the inner tube 120 may have a square, hexagon, or other cross-sectional configuration.

Figure 3:
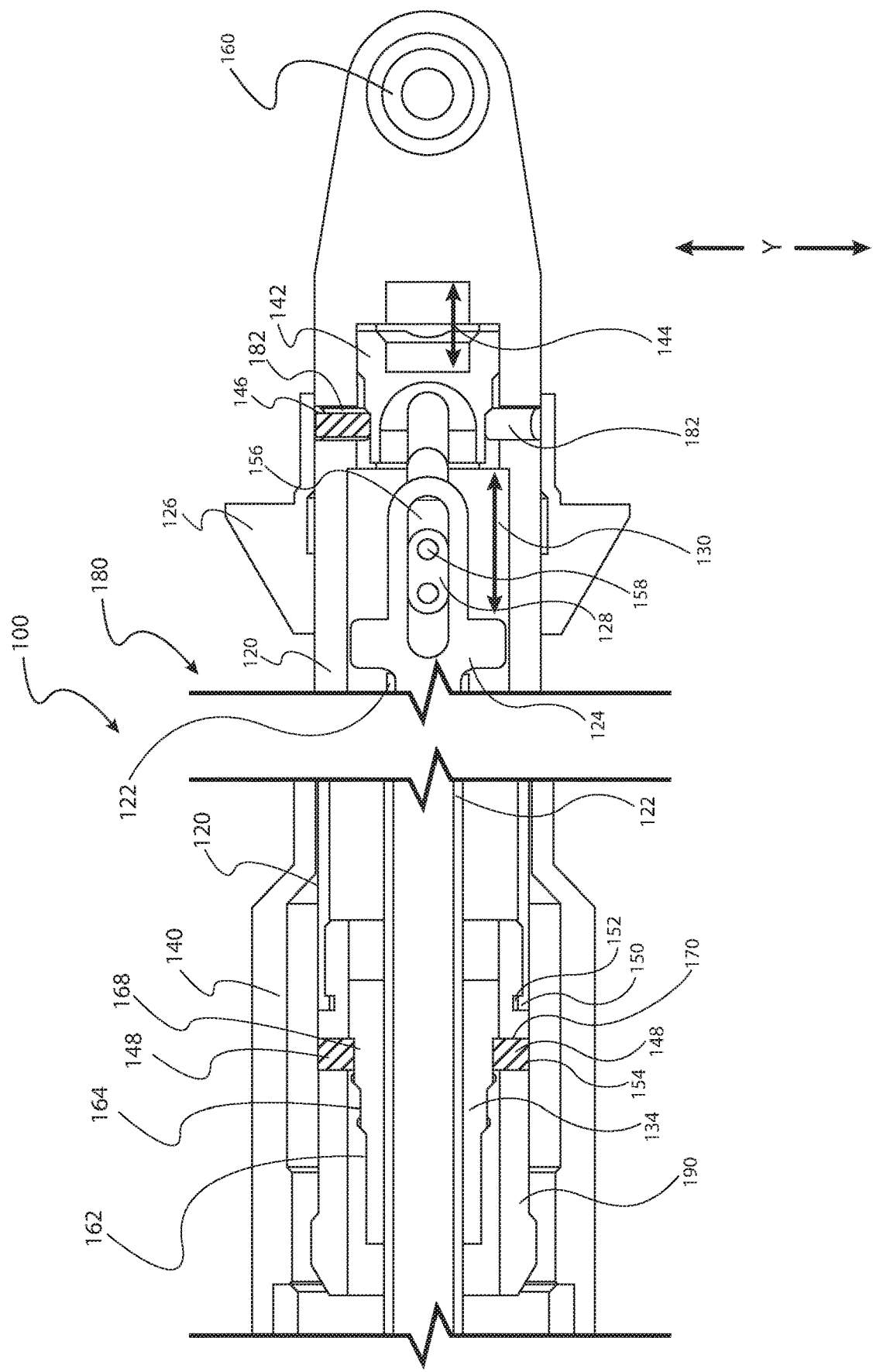
FIG. 3 illustrates a partial cross section of the hold open rod of FIG. 1 in a locked configuration.

The inner tube 120 is configured to slide into the outer tube 140 to shorten the length of the hold open rod 100 such as when a door or hatch is shut. In particular, an axis between the faster portions 160 may be defined as the axial axis and the inner tube 120 may be configured to slide into the outer tube 140 along the axial axis. Then when the door or hatch is opened, the inner tube 120 slides out of the outer tube 140. To lock the inner tube 120 with respect to the outer tube 140 a locking mechanism 180 may be utilized as shown in FIG. 3. The inner tube 120 and the outer tube 140 may be made of metal such as aluminum, steel, titanium, or the like, or may be made from a synthetic material such as plastic, reinforced plastic, composite materials such as carbon fiber, or any other suitable materials.

Figure 2:
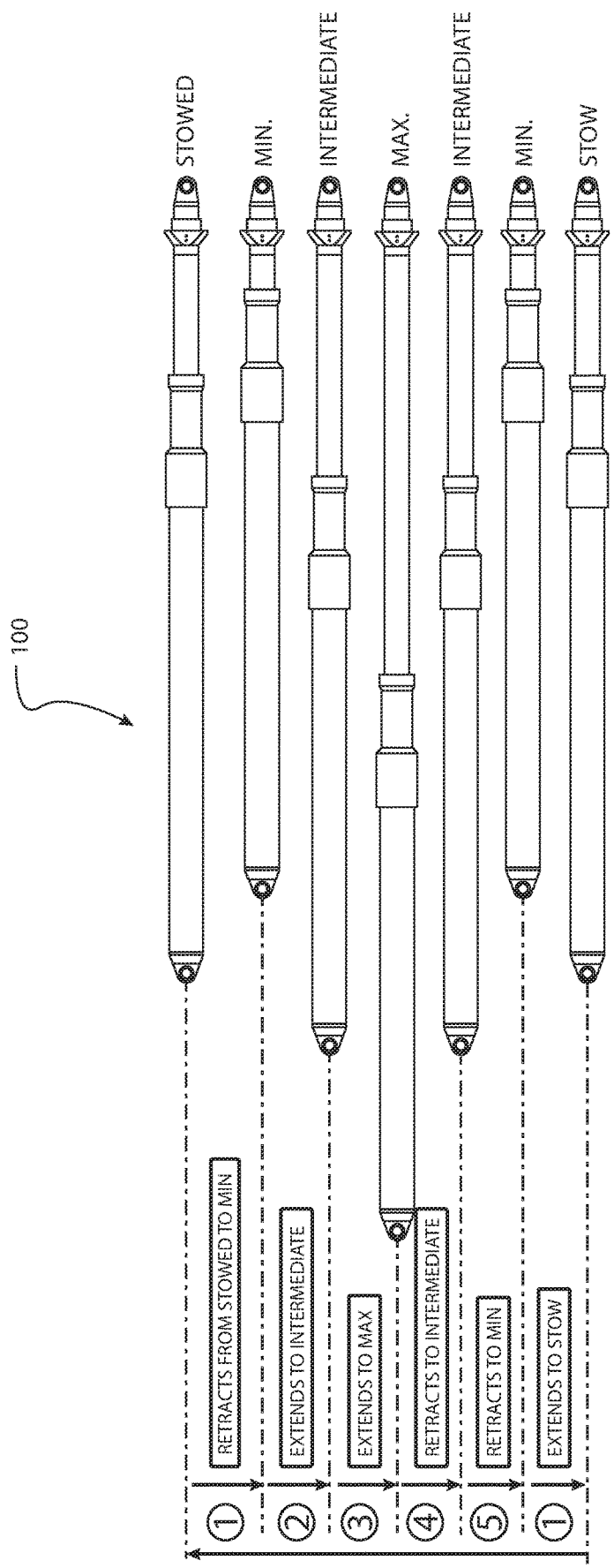
FIG. 2 illustrates various kinematic configurations of the hold open rod of FIG. 1.

FIG. 2 illustrates various kinematic configurations of the hold open rod of FIG. 1. In particular, FIG. 2 illustrates the configuration of the hold open rod 100 as the hold open rod 100 transitions between five different configurations. Transition 1 is a transition of the hold open rod 100 from a stowed configuration to a minimum length configuration. Transition 2 is a transition of the hold open rod 100 from a minimum length configuration to an intermediate length configuration. Transition 3 is a transition of the hold open rod 100 from an intermediate length configuration to a maximum length configuration. Transition 4 is a transition of the hold open rod 100 from a maximum length configuration to the intermediate length configuration. Transition 5 is a transition of the hold open rod 100 from the intermediate length configuration to a minimum length configuration. Transition 1 is a transition of the hold open rod 100 from the minimum length configuration back to the stowed length configuration.

Figure 4:
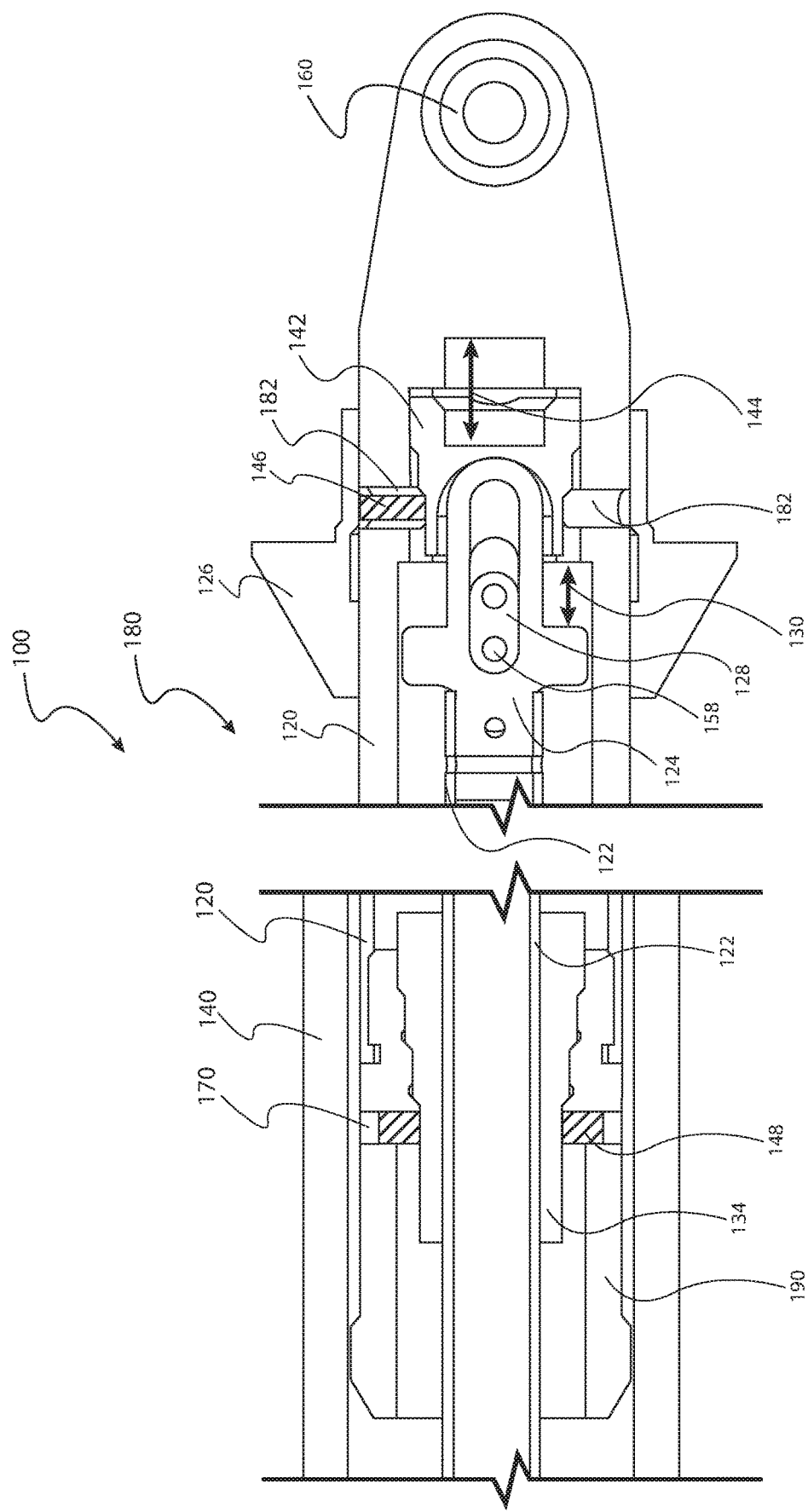
FIG. 4 illustrates a partial cross section of the hold open rod of FIG. 1 in an unlocked configuration.

FIG. 3 illustrates a partial cross section of the hold open rod of FIG. 1 in a locked configuration; and FIG. 4 illustrates a partial cross section of the hold open rod of FIG. 1 in an unlocked configuration. In FIG. 3, the locking mechanism 180 is exposed to reveal a lock body 190 and locking dogs 148. As shown in FIG. 3, there are two locking dogs 148. However, it is contemplated that any number of locking dogs 148 may be utilized including just a single locking dog 148. The locking dogs 148 may have an angled, rounded, or chamfered corner or corners on an outer surface that slides along the surfaces 162, 164, 168 of a locking plug 134 as well as an inner wall 154 of the outer tube 140. The lock body 190 is shown in cross-section in the Figures. In one aspect, the lock body 190 may have a generally cylindrical construction.

The locking mechanism 180 in FIG. 3 is shown in a locked position. This is in contrast to FIG. 4, which shows a cross-sectional view of the locking mechanism 180 in an unlocked configuration.

As shown in FIG. 3, the locking mechanism 180 may include the lock body 190 that may be attached to one end of the inner tube 120. The lock body 190 may be attached to the inner tube 120 via threads, press fit, fasteners, rigid connection points, an epoxy or other adhesive, or any other suitable construction. In one aspect, extensions 150 from the inner tube 120 may be arranged to extend into associated slots 152 of the lock body 190. The lock body 190 may be made of metal such as aluminum, steel, titanium, or the like or may be made from a synthetic material such as plastic, reinforced plastic, composite materials such as carbon fiber, or any other suitable materials. The lock body 190 may include one or more apertures 170 that are configured to receive the locking dogs 148. The one or more apertures 170 are configured to allow the locking dogs 148 to radially move in and out of the lock body 190 along the direction of arrow Y.

The inner wall 154 of the outer tube 140 may form a locking surface, which may act as a camming surface for contacting the locking dogs 148. When the locking dogs 148 are extended to contact the inner wall 154 of the outer tube 140, the locking dogs 148 are in the locked position. The locking mechanism 180 may also include the locking plug 134 as shown in FIG. 3. The locking plug 134 extends the locking dogs 148 onto the inner wall 154 of the outer tube 140 when the locking plug 134 is in a locking position as shown in FIG. 3. In particular, the locking plug 134 may include multiple surfaces, each of which are configured to support the locking dogs 148. When the locking dog 148 is arranged on a first surface 162 of the locking plug 134, the locking mechanism 180 is in an unlocked configuration; when the locking dog 148 is arranged on a second surface 164 of the locking plug 134, the locking mechanism 180 is in an intermediate locked configuration; and when the locking dog 148 is arranged on a third surface 168 of the locking plug 134, the locking mechanism 180 is in a locked configuration. The location of the locking dog 148 on the locking plug 134 may be a function of a position of the locking plug 134 with respect to the lock body 190. There may be ridges 176 (see FIG. 6) between each of the surfaces 162, 164, 168 to limit movement of the locking dog 148 between the surfaces 162, 164, 168. In particular aspects, the ridges 176 between each of the surfaces 162, 164, 168 limit movement of the locking dog 148 such that the hold open rod 100 is configured to prevent unlocking while under a load. This no unlock under load functionality may prevent inadvertent unlocking of the hold open rod 100 while it is supporting a load. Additionally, other components of the hold open rod 100 further provide this no unlock under load functionality as is apparent from the disclosure. The locking plug 134 is shown in cross-section in the Figures. In one aspect, the locking plug 134 may have a generally cylindrical construction with stepped portions associated with the surfaces 162, 164, and 168.

A lock transfer bar 122 may be attached to the locking plug 134 in any manner of ways such as press fit, welding, an adhesive such as an epoxy, fasteners, or any other suitable way of fastening the lock transfer bar 122 to the locking plug 134. In one aspect, the lock transfer bar 122 may be structured as a single component to include the locking plug 134. The lock transfer bar 122 is shown in cross-section in the Figures. In one aspect, the lock transfer bar 122 may have a generally cylindrical construction.

When the locking plug 134 is moved to the left away from the inner tube 120 as shown in FIG. 3, the locking dogs 148 are forced into contact with the inner wall of the outer tube 140. In this regard, the locking plug 134 is moved such that the locking dogs 148 are arranged on the surface 168. The locking dogs 148 cause the outer tube 140 to be fixed or locked with respect to the inner tube 120.

In FIG. 4, the lock transfer bar 122 has moved the locking plug 134 to the right, or in other words, into the inner tube 120. The reduced diameter of the first end of the locking plug 134 has permitted the locking dogs 148 to move radially inward as they are now supported by the surface 162. This movement causes the locking dogs 148 to move out of engagement with the inner wall 154 of the outer tube 140.

Once the locking dogs 148 have moved inwards, the outer tube 140 and the inner tube 120 are no longer locked together. Thus, when the locking mechanism 180 is in the unlocked position, as shown in FIG. 4, the inner tube 120 is free to move into the interior of the outer tube 140, thereby allowing a collapsing of the hold open rod 100. Moving the inner tube 120 into the outer tube 140 allows a door or hatch to which the hold open rod 100 is attached to move to a closed position. Just as the locking mechanism 180 has been described as moving from a locked position to an unlocked position, the locking mechanism 180 can also move from an unlocked position shown in FIG. 4 to the locked position shown in FIG. 3.

The locking mechanism 180 further includes a T-shaped portion 124 that may be connected to the lock transfer bar 122. When the T-shaped portion 124 moves left or right, the lock transfer bar 122 also moves left or right and thus moves the locking plug 134 left or right. In particular, when the T-shaped portion 124 moves left, the lock transfer bar 122 also moves left, the locking plug 134 moves left, and the locking dogs 148 are pressed against the inner wall 154 of the outer tube 140 to place the hold open rod 100 in the locked configuration. On the other hand, when the T-shaped portion 124 moves right, the lock transfer bar 122 also moves right, the locking plug 134 moves right, and the locking dogs 148 are released from the inner wall 154 of the outer tube 140 to place the hold open rod 100 in the unlocked configuration.

The position of the T-shaped portion 124 may be controlled by one or more of a connector 128, a spring 130 (shown schematically is an arrow), a detent collar 126, a detent locking shield 142, a detent collar dog 146, and a spring 144 (shown schematically is an arrow). It is contemplated that any number of detent collar dogs 146 may be utilized including just a single detent collar dog 146. The detent collar dog 146 may have an angled, rounded, or chamfered corner or corners on an outer surface. The detent collar 126 may be configured to surround the inner tube 120. The detent collar 126 may be moved by a user to perform an unlocking procedure as detailed below. The detent collar 126 is shown in cross-section in the Figures. In one aspect, the detent collar 126 may have a generally cylindrical construction with a ramped outer surface. In various aspects, the springs may be implemented as coil springs, wave springs, compression springs, flat springs, helical springs, or the like.

The position of the detent collar 126 controls the position of the connector 128. The connector 128 may be connected through a slot in the inner tube 120 to the detent collar 126 and moves therewith. The connector 128 may include a fastener 158 that fastens the connector 128 to the detent collar 126. Accordingly, movement laterally by the detent collar 126 will likewise move the connector 128 laterally. The connector 128 may be arranged in a slot 156 of the T-shaped portion 124 and limits and/or controls movement of the T-shaped portion 124. As shown in FIG. 3, the connector 128 has moved left together with the detent collar 126 allowing the T-shaped portion 124 freedom to move towards the left (the connector 128 is positioned in the middle of the slot 156). The T-shaped portion 124 may be forced towards the left in response to a force provided by the spring 130 (schematically shown as an arrow). This movement of the T-shaped portion 124 causes a corresponding movement of the locking plug 134 to the left forcing the locking dogs 148 onto the surface 168 and radially outward to contact the inner wall 154 to lock the inner tube 120 to the outer tube 140.

Figure 7:
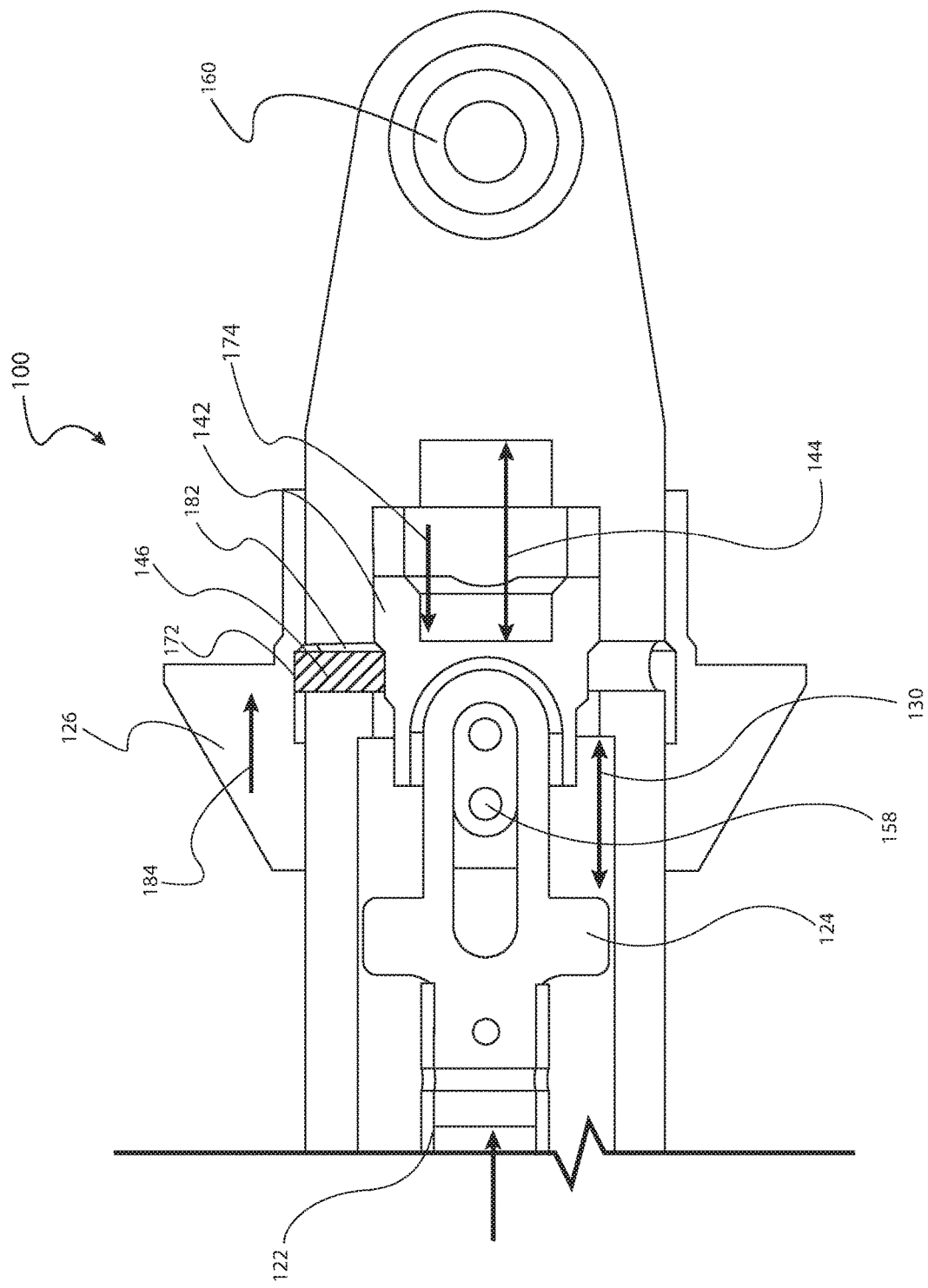
FIG. 7 illustrates a partial cross section of one end of the hold open rod of FIG. 1 in a detent setting configuration.

A detent collar dog 146 may be configured to control the movements of the detent collar 126. In this regard, the detent collar dog 146 may be arranged in an aperture 182 between the detent locking shield 142 and the detent collar 126 (note that the detent collar dog 146 is illustrated in the aperture 182 in the upper location of the hold open rod 100 and the detent collar dog 146 is not shown in the aperture 182 in a lower location of the hold open rod 100 for better understanding of the configuration). When the detent locking shield 142 is in a rightward position, as shown in FIG. 3, it may allow the detent collar dog 146 to have limited contact with an inner surface of the detent collar 126 and allow movement of the detent collar 126. When the detent locking shield 142 has moved to a leftward position, as shown in FIG. 7, it may force the detent collar dog 146 through the aperture 182 to engage a detent space 172 of the detent collar 126 and lock the detent collar 126 in a rightward position. In other aspects, a detent system may be utilized without the detent collar dog 146 to provide the same functionality as noted above. The detent locking shield 142 is shown in cross-section in the Figures. In one aspect, the detent locking shield 142 may have a generally cylindrical construction.

As shown in FIG. 4, the T-shaped portion 124 is positioned towards the right. This position of the T-shaped portion 124 causes the corresponding movement of the locking plug 134 to the right allowing the locking dogs 148 to move radially inward to unlock the inner tube 120 from the outer tube 140.

Figure 5:
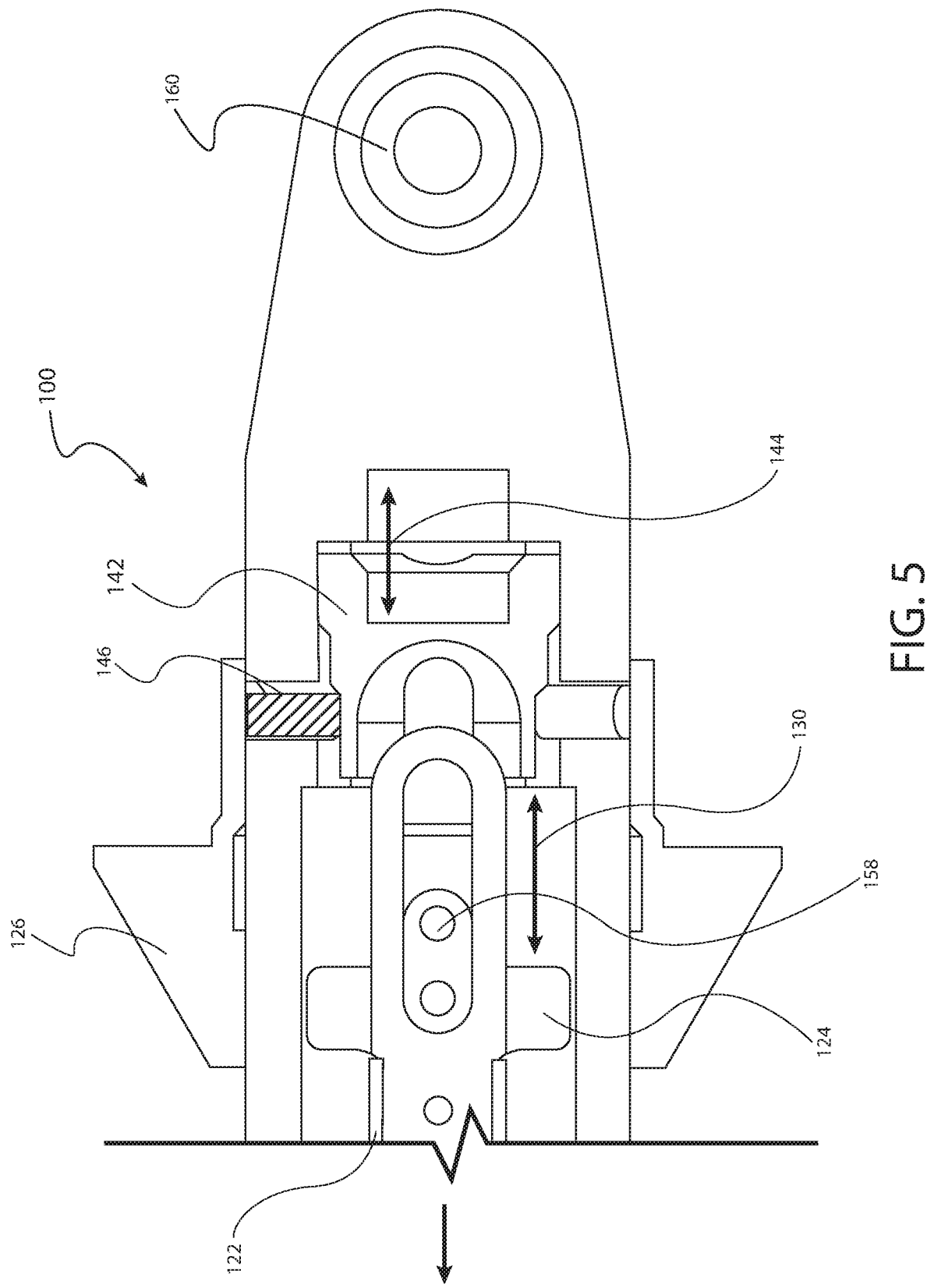
FIG. 5 illustrates a partial cross section of one end of the hold open rod of FIG. 1 in a locked intermediate configuration.
Figure 6:
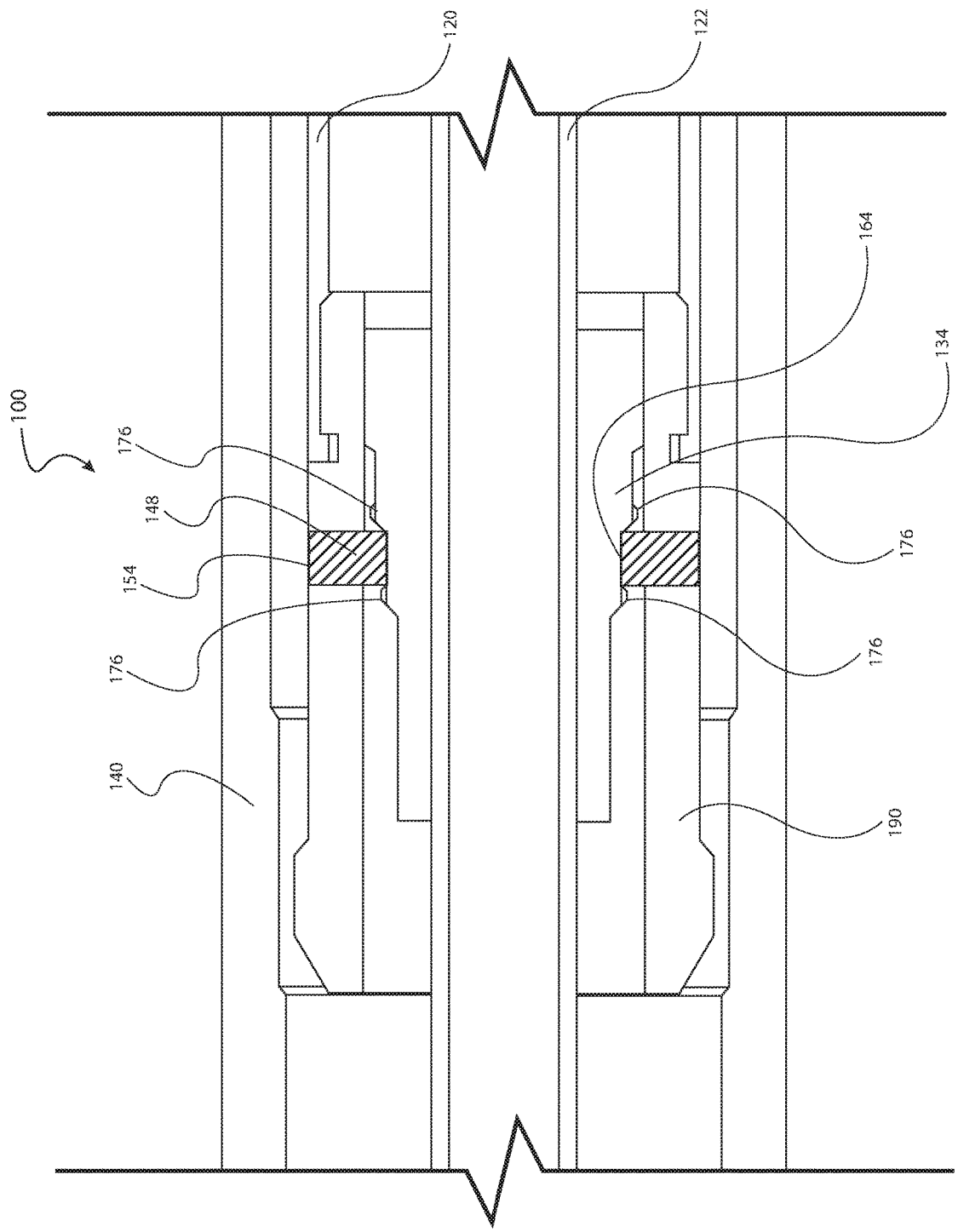
FIG. 6 illustrates a partial cross section of another end of the hold open rod of FIG. 1 in the locked intermediate configuration.

FIG. 5 illustrates a partial cross section of one end of the hold open rod of FIG. 1 in a locked intermediate configuration; and FIG. 6 illustrates a partial cross section of another end of the hold open rod of FIG. 1 in the locked intermediate configuration. In particular, as the outer tube 140 begins to extend away from the inner tube 120, the spring 130 may be pressed against the T-shaped portion 124 extending the lock transfer bar 122 in the leftward direction. At the same time the detent collar dog 146 may be held by the detent collar 126 to engage and maintain the detent locking shield 142 in the position shown in FIG. 5.

As shown in FIG. 6, the leftward movement of the lock transfer bar 122 urges the locking plug 134 into the lock body 190. This moves the locking dog 148 from the unlocked position shown in FIG. 4 to an intermediate locked position where the locking dog 148 may be arranged on the surface 164 and begins to press on the inner wall 154 of the outer tube 140.

Thereafter, the spring 130 may further press against the T-shaped portion 124 extending the lock transfer bar 122 further in the leftward direction. The further leftward movement of the lock transfer bar 122 urges the locking plug 134 into the lock body 190. This moves the locking dog 148 from the intermediate locked position shown in FIG. 6 to the locked position where the locking dog 148 may press on the inner wall 154 of the outer tube 140 and locks the outer tube 140 to the inner tube 120 as illustrated in FIG. 3.

Figure 8:
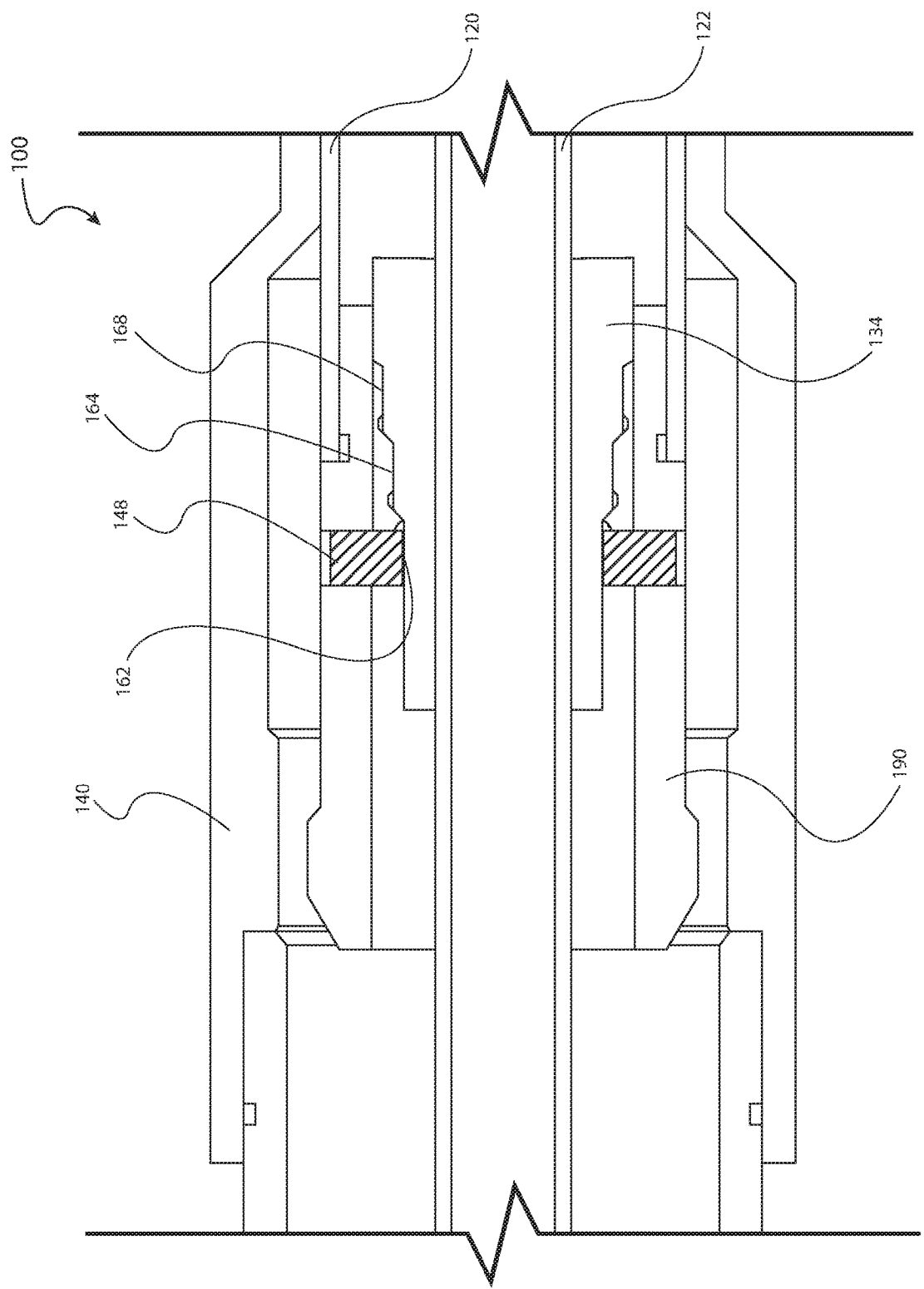
FIG. 8 illustrates a partial cross section of another end of the hold open rod of FIG. 1 in the detent setting configuration.

FIG. 7 illustrates a partial cross section of one end of the hold open rod of FIG. 1 in a detent setting configuration; and FIG. 8 illustrates a partial cross section of another end of the hold open rod of FIG. 1 in the detent setting configuration. In particular, FIG. 7 illustrates where the detent collar 126 has been moved in the right direction by the user (as shown by arrow 184). This provides a vertical space for the detent collar dog 146 to move radially outwardly into a detent space 172 associated with the detent collar 126. This allows the detent locking shield 142 to move in the left direction (as shown by arrow 174) in response to force provided by the spring 144 (schematically shown as an arrow). When the detent locking shield 142 has moved to a leftward position it may force the detent collar dog 146 through the aperture to engage the detent space 172 of the detent collar 126 and lock the detent collar 126 in a rightward position. Additionally, the rightward movement of the detent collar 126 moves the connector 128 in the right direction as well that results in the lock transfer bar 122 being moved in the right direction.

As shown in FIG. 8, as the lock transfer bar 122 moves in the right direction, the locking plug 134 moves in the right direction as well allowing the locking dog 148 to move to the surface 162 and radially inward with respect to the lock body 190. This unlocks the locking mechanism 180 of the hold open rod 100.

Figure 9:
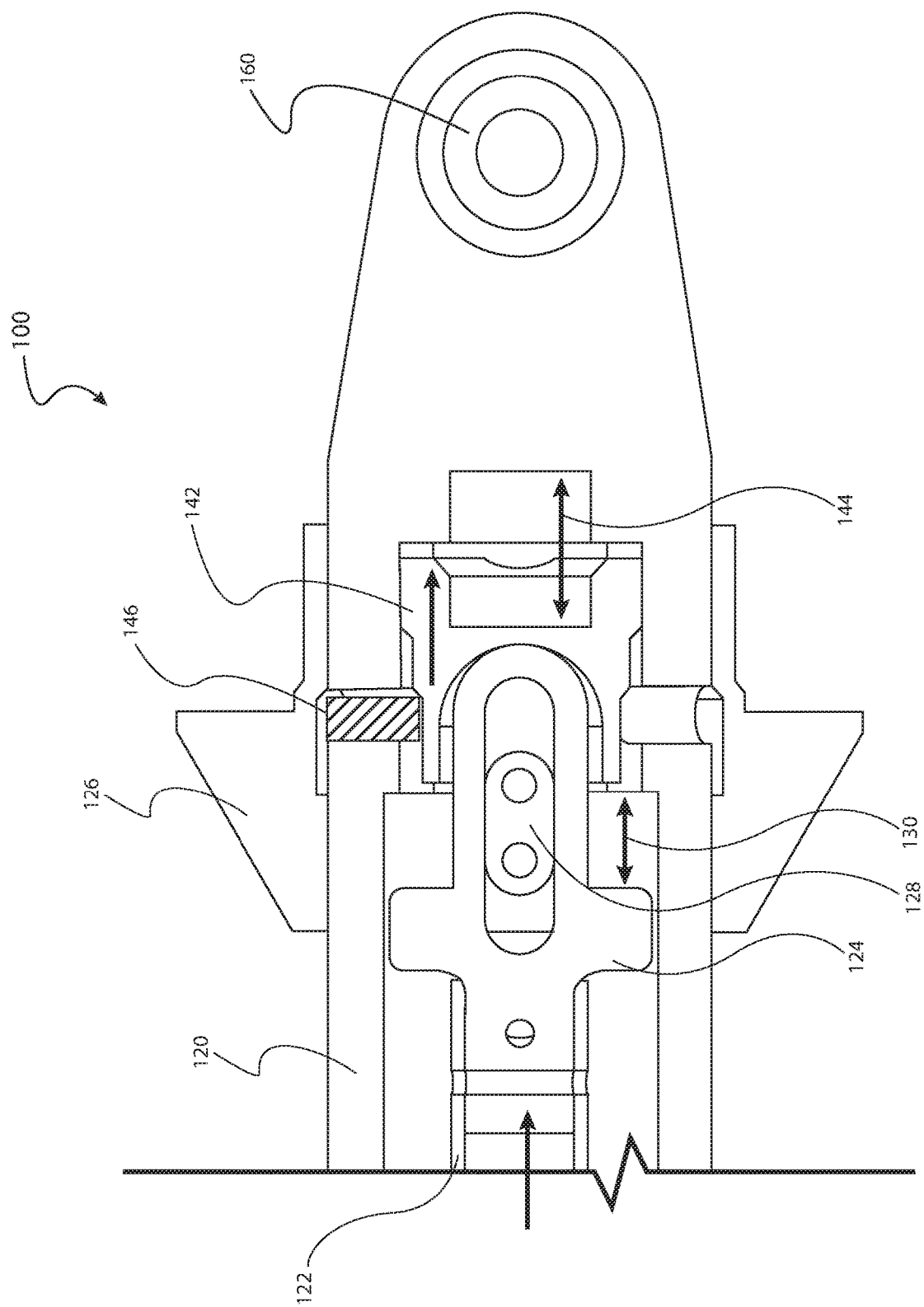
FIG. 9 illustrates a partial cross section of one end of the hold open rod of FIG. 1 in a first detent release configuration.
Figure 10:
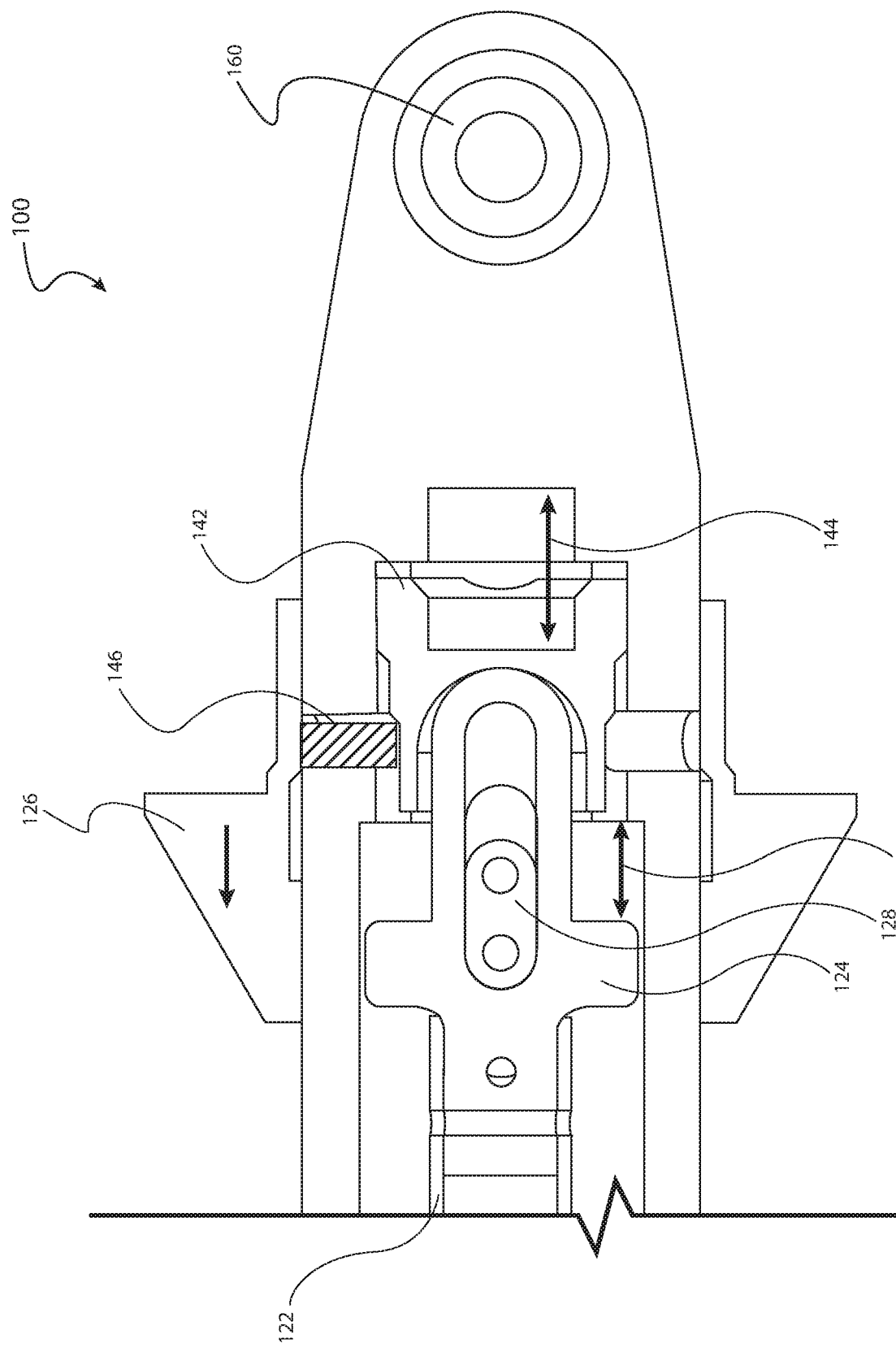
FIG. 10 illustrates a partial cross section of one end of the hold open rod of FIG. 1 in a second detent release configuration.
Figure 11:
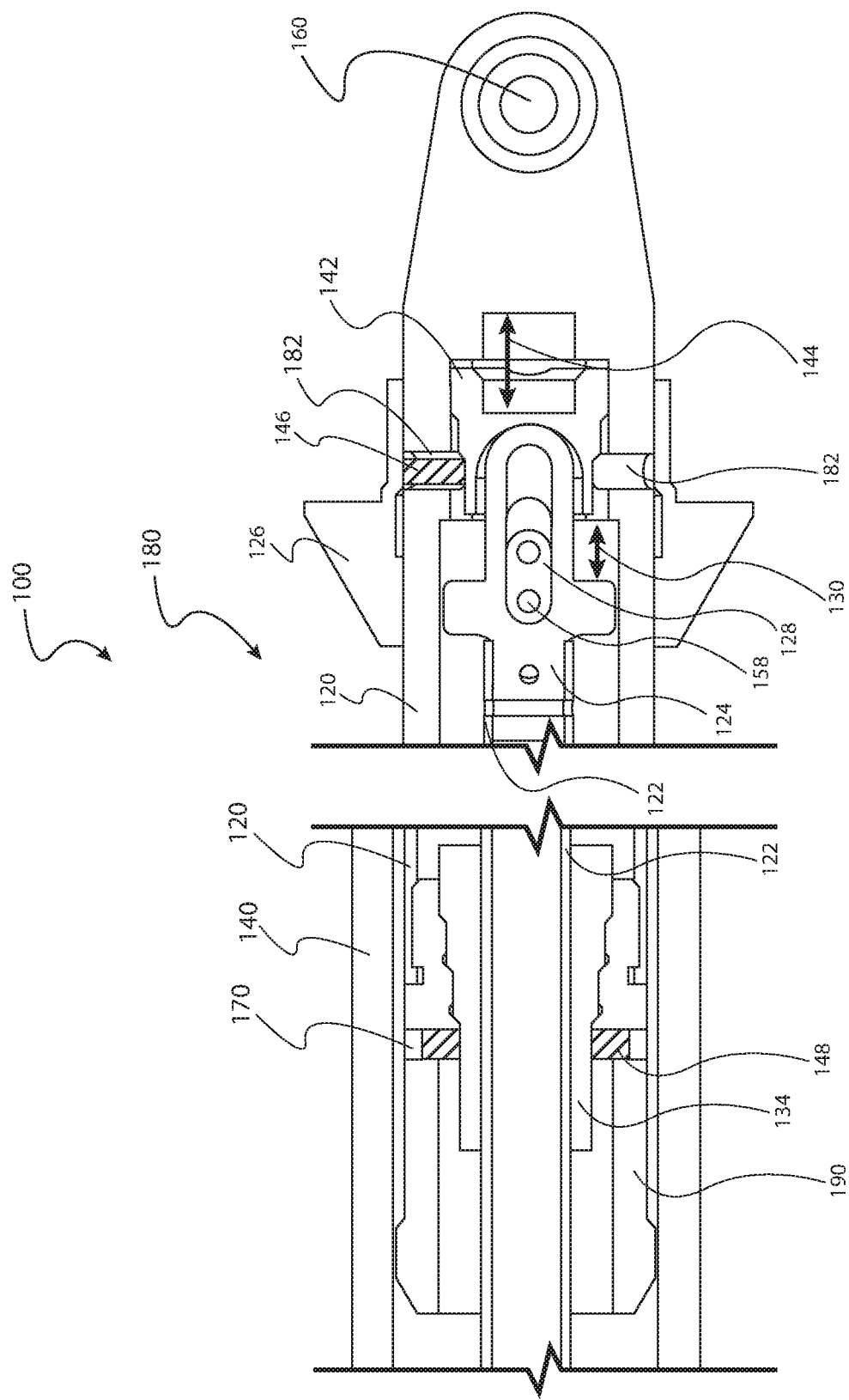
FIG. 11 illustrates a partial cross section of the hold open rod of FIG. 1 in the unlocked configuration.

FIG. 9 illustrates a partial cross section of one end of the hold open rod of FIG. 1 in a first detent release configuration; FIG. 10 illustrates a partial cross section of one end of the hold open rod of FIG. 1 in a second detent release configuration; and FIG. 11 illustrates a partial cross section of the hold open rod of FIG. 1 in the unlocked configuration.

In particular, FIG. 9 illustrates the minimum kinematic configuration of the hold open rod 100. In this regard, the minimum length configuration forces the lock transfer bar 122 towards the right such that it moves the T-shaped portion 124 and the detent locking shield 142 in the right direction as well. In one aspect, the minimum length configuration forces the lock transfer bar 122 towards the right when the lock body 190 contacts an end of the outer tube 140 forcing the lock transfer bar 122 to the right.

In this configuration, the detent collar dog 146 may move radially inwardly allowing the detent collar 126 to move to the left as illustrated in FIG. 10. This action returns the hold open rod to the unlocked configuration as illustrated in FIG. 11.

Accordingly, the disclosure has set forth an improved hold open rod and locking mechanism that provides robust intermediate locking functionality, functions over long periods of time, holds large loads, and the like.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the disclosure. As used herein, the term "and/or" includes any and all combinations of one or more of the associated listed items.

Relative terms such as "left" or "right" or "below" or "above" or "upper" or "lower" or "horizontal" or "vertical" may be used herein to describe a relationship of one element or region to another element or region as illustrated in the Figures. It will be understood that these terms and those discussed above are intended to encompass different orientations of the device in addition to the orientation depicted in the Figures.

The terminology used herein is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A hold open rod comprising:
   an inner member;
   an outer member configured to have the inner member slide in and out of the outer member;
   a locking mechanism configured to selectively lock the inner member and the outer member with respect to each other, the locking mechanism comprising:
      a locking plug configured to move axially along an axis of the inner member and the outer member to a locking position and an unlocking position;
      a locking dog configured to move radially between a locking position and an unlocking position as a result of a camming action with the locking plug as the locking plug moves axially; and
      a lock transfer bar operatively connected to the locking plug and configured to move the locking plug to the locking position and the unlocking position when the lock transfer bar is moved, wherein the locking mechanism is configured to lock the inner member and the outer member with respect to each other along a number of intermediate positions between a maximum length and a minimum length;
a member arranged inside the inner member, the member configured to connect to the lock transfer bar;
the member configured to control movement of the lock transfer bar;
a collar arranged on an exterior portion of the inner member;
a detent locking shield;
a detent system responsive to the detent locking shield, the detent system configured to control movement of the collar; and
the collar and the detent locking shield being configured to control movement of the lock transfer bar.

2. The hold open rod of claim 1, further comprising:
a detent locking dog; and
the detent locking dog configured to selectively lock a position of the detent locking shield.

3. The hold open rod of claim 1, wherein the locking plug is configured to move axially along an axis of the inner member and the outer member to the locking position, an intermediate locking position, and the unlocking position.

4. The hold open rod of claim 1, wherein the locking plug comprises a first surface associated with the locking position, a second surface associated with an intermediate locking position, and a third surface associated with the unlocking position.

5. The hold open rod of claim 1, comprising a fastener for attaching the hold open rod to a door or hatch, wherein the hold open rod is attached to the door or the hatch in an aircraft.

6. The hold open rod of claim 1, wherein the hold open rod is a composite material; and wherein the locking mechanism is configured to prevent unlocking while the hold open rod is under a load.

7. A hold open rod comprising:
an inner member;
an outer member configured to have the inner member slide in and out of the outer member;
a locking mechanism configured to selectively lock the inner member and the outer member with respect to each other, the locking mechanism comprising:
a locking plug configured to move axially along an axis of the inner member and the outer member to a locking position and an unlocking position;
a locking dog configured to move radially between a locking position and an unlocking position as a result of a camming action with the locking plug as the locking plug moves axially; and
a lock transfer bar operatively connected to the locking plug and configured to move the locking plug to the locking position and the unlocking position when the lock transfer bar is moved;
a member arranged inside the inner member, the member configured to connect to the lock transfer bar;
the member configured to control movement of the lock transfer bar;
a collar arranged on an exterior portion of the inner member;
a detent locking shield;
a detent system responsive to the detent locking shield, the detent system configured to control movement of the collar; and
the collar and the detent locking shield being configured to control movement of the lock transfer bar.

8. The hold open rod of claim 7, further comprising:
a detent locking dog; and
the detent locking dog configured to selectively lock a position of the detent locking shield.

9. The hold open rod of claim 7, wherein the locking plug is configured to move axially along an axis of the inner member and the outer member to the locking position, an intermediate locking position, and the unlocking position.

10. The hold open rod of claim 7, wherein the locking plug comprises a first surface associated with the locking position, a second surface associated with an intermediate locking position, and a third surface associated with the unlocking position.

11. The hold open rod of claim 7, comprising a fastener for attaching the hold open rod to a door or hatch, wherein the hold open rod is attached to the door or the hatch in an aircraft.

12. The hold open rod of claim 7, wherein the hold open rod is a composite material; and wherein the locking mechanism is configured to prevent unlocking while the hold open rod is under a load.

13. The hold open rod of claim 2, wherein the locking plug is configured to move axially along an axis of the inner member and the outer member to the locking position, an intermediate locking position, and the unlocking position.

14. The hold open rod of claim 2, wherein the hold open rod is a composite material; and wherein the locking mechanism is configured to prevent unlocking while the hold open rod is under a load.

15. The hold open rod of claim 1, further comprising:
a detent locking dog,
wherein the locking plug is configured to move axially along an axis of the inner member and the outer member to the locking position, an intermediate locking position, and the unlocking position; and
wherein the locking plug comprises a first surface associated with the locking position, a second surface associated with an intermediate locking position, and a third surface associated with the unlocking position.

16. The hold open rod of claim 15, comprising a fastener for attaching the hold open rod to a door or hatch, wherein the hold open rod is attached to the door or the hatch in an aircraft, wherein the detent locking dog is configured to selectively lock a position of the detent locking shield.

17. The hold open rod of claim 15, wherein:
the locking mechanism is configured to prevent unlocking while the hold open rod is under a load; and
the locking plug is configured to move axially along an axis of the inner member and the outer member to the locking position, an intermediate locking position, and the unlocking position.

18. The hold open rod of claim 7, further comprising:
a detent locking dog,
wherein the locking plug is configured to move axially along an axis of the inner member and the outer member to the locking position, an intermediate locking position, and the unlocking position; and
wherein the locking plug comprises a first surface associated with the locking position, a second surface associated with an intermediate locking position, and a third surface associated with the unlocking position.

19. The hold open rod of claim 18, wherein the detent locking dog is configured to selectively lock a position of the detent locking shield.

20. The hold open rod of claim 18, comprising a fastener for attaching the hold open rod to a door or hatch, wherein the hold open rod is attached to the door or the hatch in an aircraft.

\* \* \* \* \*